May 14, 1957  A. R. COVIELLO  2,791,952
AGRICULTURAL IMPLEMENT
Filed Nov. 9, 1953  3 Sheets-Sheet 1
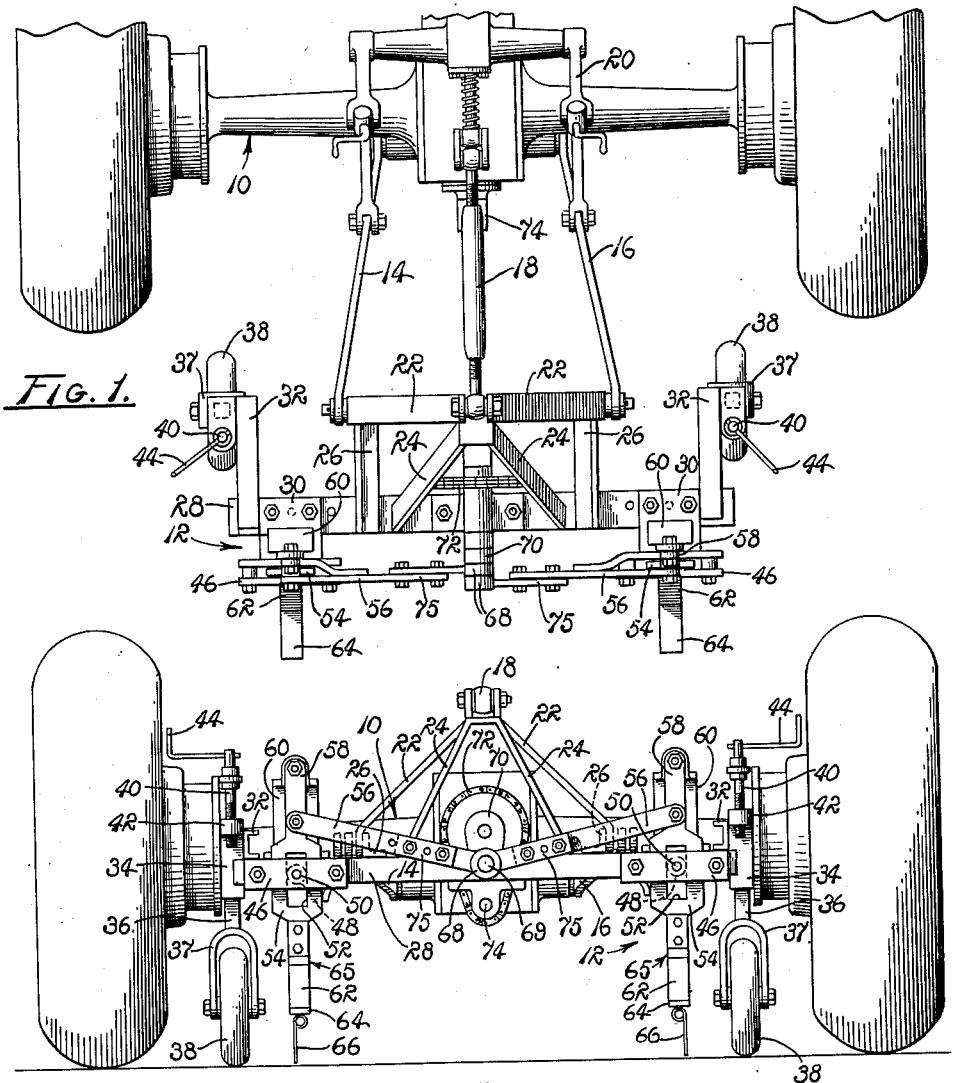

May 14, 1957  A. R. COVIELLO  2,791,952
AGRICULTURAL IMPLEMENT
Filed Nov. 9, 1953  3 Sheets-Sheet 2

ANTHONY R. COVIELLO
INVENTOR

HUEBNER, BEEHLER,
WORREL & HERZIG
ATTORNEYS

BY
Richard M. Worrel

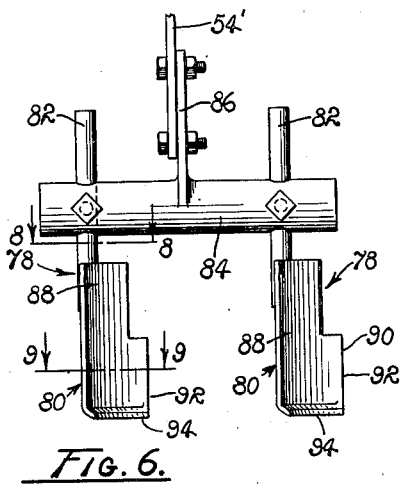
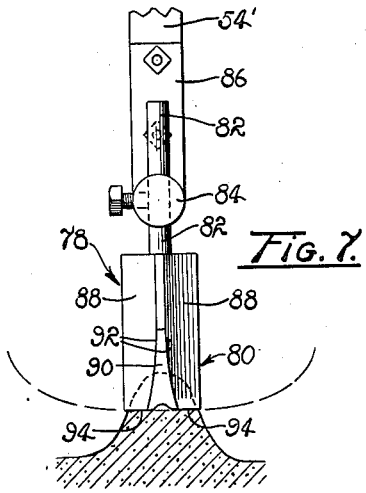
Fig. 6.  Fig. 7.
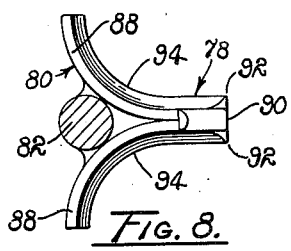
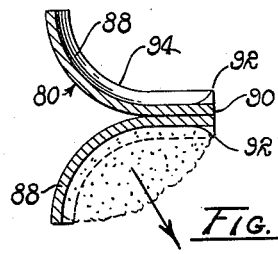
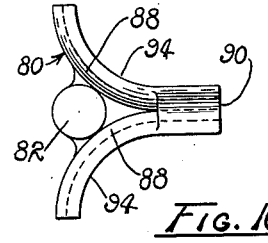
Fig. 8.  Fig. 9.  Fig. 10.
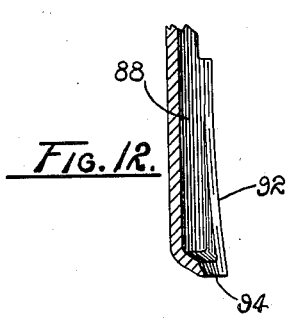
Fig. 12.
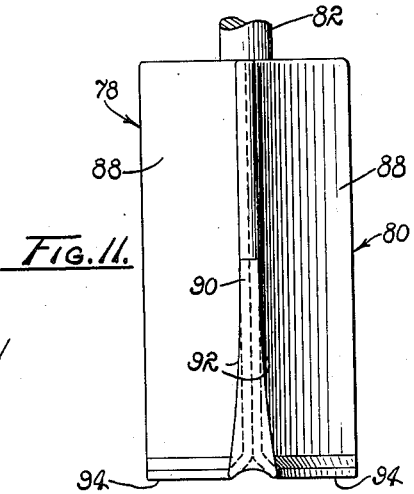
Fig. 11.
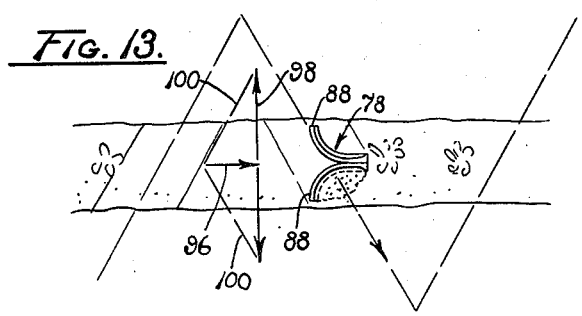
Fig. 13.
ANTHONY R. COVIELLO
INVENTOR
HUEBNER, BEEHLER,
WORREL & HERZIG
ATTORNEYS ns patented May 14, 1957

2,791,952
AGRICULTURAL IMPLEMENT
Anthony R. Coviello, Tulare, Calif.

Application November 9, 1953, Serial No. 390,930

11 Claims. (Cl. 97—13)

This invention relates to agricultural implements and more particularly to an earth working tool for use in weeding, thinning and/or chopping row crops, such as cotton, vegetables and the like.

In the cultivation of many row crops and in particular cotton, it is necessary to weed and thin out the plants in the rows during various stages of growth as well as to loosen the soil around young plants. Various cultivators are known for at least partially effecting these results. The most popular utilize a hoe or other chopping tool borne by an arm which is pivotally mounted on a support frame for reciprocal soil engaging strokes transversely of the normal direction of movement of the frame. As such cultivators are moved along the rows of crops, various drive means are employed for imparting the lateral reciprocation to the arms carrying the hoes or chopping tools, thus in effect, sweeping the tool pendulum-like across the rows at selected intervals.

It will be noted that the ultimate arcs along which the tools of presently known cultivators travel are minute fractions of relatively large circles. For various reasons this particular type of motion for the tool has been found undesirable. In actuality, the motion of the tool closely approaches a flat rectilineal path. This in large measure is due to the small arc traversed as well as the long radius of the mounting arm needed to give the required mechanical advantage.

Although the row crops in which such tools are employed are usually grown on ridges of soil, the flat arcuate tool travel is entirely unsatisfactory. The hoes or other tools frequently fail to leave the ground at the ends of their reciprocal paths of travel and thus are incapable of desired chopping action. They fail to clear themselves of weeds and debris at the ends of their strokes and resultant accumulation soon renders them inoperable. Frequent manual clearing is required if operation is to be at all continuous. When even partially congested, their cumbersome action is difficult to direct and frequently as hazardous to plants which are to be nurtured as weeds which are to be removed.

It is therefore an object of this invention to provide an improved implement of the character to which reference has been made imparting a more efficient type of chopping stroke to tools utilized therein.

Another object is to provide an implement which has a chopping or cultivating tool capable of digging relatively deeply into the soil and lifting far enough out of the soil while traversing a path of travel effective in earth-working, chopping, and self-cleaning functions.

Another object is to provide an implement of the character described wherein the earth working tool thereof is simultaneously subjected to lifting and pivoting movements as it sweeps across the row.

Another object is to provide an implement for loosening the soil around young plants of a tender nature without damage thereto by causing the cultivating tool to flick across the rows of plants and to be abruptly lifted after each contact with the soil.

It is another object to provide an earth working tool which gathers or digs a wider swath of soil during its reciprocal action whereby a more thorough thinning and weeding of the crops is accomplished.

Additional objects and advantages are to provide improved elements and arrangements thereof in a device of the character and for the purpose set forth that is fully effective in performing its intended functions, economical to produce, durable, and conveniently adjustable to varied operational environments.

Further objects and advantages will become apparent in the subsequent description in the specification.

In the drawings:

Fig. 1 is a fragmentary plan view of a tractor having an implement embodying the principles of the present invention operably connected thereto.

Fig. 2 is a rear view of the implement and fragmentarily represented tractor shown in Fig. 1.

Fig. 3 is a rear elevation of the implement per se demonstrating a stage of operation following that represented in Figs. 1 and 2.

Fig. 6 is a fragmentary side elevation of a second form of earth working tool excellently suited to utilization in the subject implement.

Fig. 7 is a fragmentary front elevation of the form of the earth working tool shown in Fig. 6 and illustrating its action in chopping a ridged row of cotton or the like.

Fig. 8 is a somewhat enlarged section taken on line 8—8 of Fig. 6.

Fig. 9 is a sectional view taken along lines 9—9 in Fig. 6 and illustrating the action of the tool in soil.

Fig. 10 is a bottom view of the tool shown in Fig. 6.

Fig. 11 is a fragmentary front view of the earth working tool shown in Fig. 6.

Fig. 12 is a vertical fragmentary sectional view taken along the radial line of the tool and looking forwardly thereof.

Fig. 13 is a diagrammatic view showing the action of the cultivating tool of Fig. 6 along a row of cotton or the like.

Figure 4:
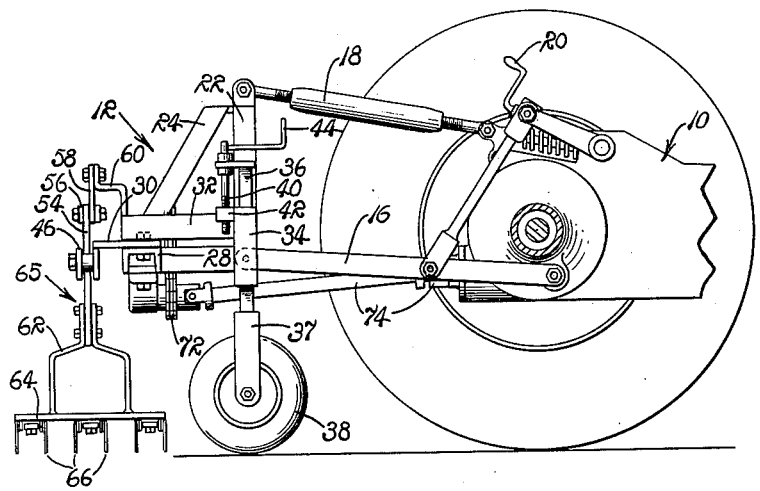
Fig. 4 is a side elevation of the implement and tractor as seen in Fig. 1 but with a wheel of the tractor removed for illustrative convenience.

This invention is shown and described as having particular use in the cultivation of cotton but it will be evident that it has application to such crops as beets and other vegetables and is not intended to be limited to the cultivation of cotton only.

Referring more particularly to Figs. 1 to 5 of the drawings, a prime mover such as tractor 10 is shown attached to the implement of the present invention generally denoted by the numeral 12. The cultivator is connected to the tractor 10 by a three-point attachment, namely, by means of the linkages 14, 16 and 18 in the conventional manner shown or other suitable to the purpose. As will be evident, the implement 12 may be raised or lowered by the hydraulic lift 20 of the tractor.

The frame of the cultivator consists of a pair of A-frame members 22 and 24. The forward A-frame members 22 are secured at their lower ends to a pair of longitudinally extending side bars 26 and the rear A-frame members 24 are secured at their lower ends to a rear transversely extending tool bar or implement support means 28. The bar 28 also is rigidly attached to the rear ends of the side bars 26, as will be apparent.

The mechanism supported by the transverse bar 28 at each of its outer ends is identical and therefore the following description will be of one end only and it is to be assumed that the same description applies to any desired multiple.

Figure 5:
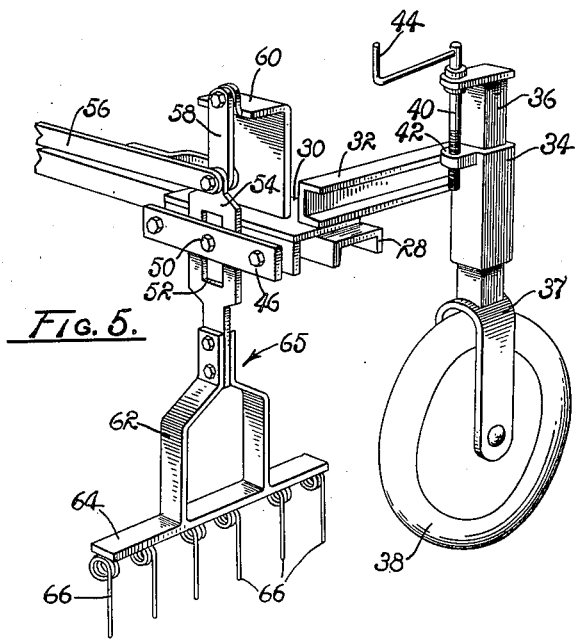
Fig. 5 is a fragmentary perspective view of a portion of the implement.

Accordingly, and referring more particularly to Fig. 5, it will be noted that a mounting plate 30 having a substantially horizontal portion and a substantially vertical portion is adjustably secured to the outer end of the transverse bar 28. Rigidly attached and extending forwardly from the top of the horizontal portion of plate 30 is a horizontally positioned channel bar 32 which has secured at its outer end a sleeve 34 shown as a substantially rectangular member. Slidably received within the sleeve 34 is a mating standard 36 having a U-shaped bracket member 37 secured to its lower end. The bracket 36 is provided with an axle between its ends for rotatably mounting a wheel 38. The upper end of standard 36 is provided with a horizontal plate for receiving one end of an adjusting screw 40, the other end of which is threadably received within an ear 42 extending outwardly from sleeve 34. As will be clear, the vertical position of transverse bar 28 and thus the entire frame of the cultivator relative to wheel 38 may be adjusted by rotating crank 44. While the wheel support described is a useful adjunct to the present invention it simply constitutes a convenient auxiliary depth control for the tool bar 28 and elements borne thereby.

The vertical portion of mounting plate 30 has a flat rectangular bar 46 mounted in spaced relation thereto by means of bolts or the like. The space provided therebetween enables the insertion of a roller or bearing sleeve 48, seen best in Figs. 2 and 3, journalled for rotation on a bolt 50 which passes therethrough and is secured at opposite ends to plates 30 and 46. The axis of bolt 50 and thus roller 48 is longitudinal of the direction of implement movement. Sleeve 48 is slidably received in an elongated substantially rectangular slot 52 of a vertically positioned guide plate 54 and serves to guide the plate, as will soon become apparent. The upper end of guide plate 54 is pivotally attached to a substantially horizontally extending connecting rod 56 and to a dependent toggle link 58. The other end of link 58 is pivotally attached on a substantially horizontal axis also substantially aligned with the forward movement of the implement to an inverted substantially L-shaped support plate 60, the latter having its lower end rigidly secured, as by welding, to the horizontal portion of mounting plate 30.

As shown, the axis of the pivotal connection between link 48 and support plate 60 lies above and in substantially the same vertical plane as the axis of roller 48. Although the preferred positions of the axes are shown, it will be readily apparent as the description proceeds that variations in their relative positions are encompassed by the present invention and may be desired in certain instances.

The lower end of guide plate 54 has a yoke 62 rigidly secured thereto. The arms of yoke 62 depend therefrom and are secured at their lower ends to a substantially horizontally positioned tool bar or foot 64. Guide plate 54, yoke 62 and bar 64 together constitute an arm generally indicated as 65 for swingably supporting a plurality of spring mounted tynes 66, the latter comprising one form of earth working tool excellently suited to the implement of the present invention.

Referring more particularly to Figs. 2 and 3, it will be seen that the connecting rod 56 is pivotally connected at its inner end by means of a bearing sleeve 68 to one arm 69 of a crank member 70. Crank 70 is secured for rotation through a drive shaft associated with a chain and sprocket mechanism, or other suitable drive linkage, generally denoted by the numeral 72, to the power taken off shaft 74 of the tractor 10. It should also be noted that provision is made at 75 for adjustment of the length of the connecting rod 56 to be performed simultaneously with corresponding lateral adjustments of plate 30 on the tool bar 28.

Operation

The operation of the described implement is believed to be clearly apparent and is briefly summarized at this point. The earth working tools are adjusted in accordance with the spacing of rows to be worked. This is accomplished by moving plates 30 inwardly or outwardly along the transverse bar 28 while simultaneously adjusting at 75 the length of the connecting rods 56. Furthermore, the height of the implement is adjusted by turning cranks 44 upwardly or downwardly, as desired. Assuming therefore that the implement is in the position shown in Fig. 2, the tractor 10 is driven forwardly longitudinally through the rows of cotton or the like. The power takeoff shaft 74 is rotated in the well known manner to drive the crank 70 which in turn causes the connecting rods 56 to swing or oscillate the arms 65 and therefore the earth working tools 66 back and forth across the rows of cotton.

The construction of the arm 65, and in particular guide plate 54, provides a slidable pivot or fulcrum for the arm 65 on the bar 28 and thus the relative motion between these two elements is both pivotal and slidable. The addition of link 58, movable only in a fractionally circular path and being connected to the upper end of arm 65 so as to move said end of the arm in a corresponding fractionally circular path, cooperates with the slidable fulcrum to control the ultimate movement of the lower end of arm 65 and the tool 66. When connecting rod 56 imparts a lateral reciprocating movement to the link 58 its constrained path is fractionally circular and thus arm 65 is not only subjected to lateral movement but also to a simultaneous vertical movement and because of the slidable fulcrum is permitted to follow these movements.

Depending upon the vertical and lateral relation of the pivotal axis between link 58 and plate 60 and the axis of roller 48, a variety of motions may be imparted to the cultivating tool, if desired. For example, as will be more apparent from a standpoint of utility after describing a second form of earth working tool, it may be desired laterally to offset to the right, as viewed in Fig. 3, the axis between link 58 and plate 60 from the axis of the roller 48. With this arrangement the swing of the tool will not be symmetrical with a vertical plane but will reciprocate farther upwardly and laterally to the left than to the right and the tool will effect a lateral chopping action principally on a side of the row. Other arrangements in this structure to secure various arcs of movement will become readily apparent to those skilled in the art.

With the illustrated arrangement of the axes, however, the tools or tynes 66 tend to flick across the rows of cotton, being sharply lifted from the ground after passing through the lower arc of their swing. Such action is highly desirable when loosening the dirt or soil in a hill of young and tender cotton plants since the flicking action created by the guide plate 54 together with the springy nature of tynes 66 does not normally damage established plants but is highly effective in agitating and loosening the soil therearound. Furthermore, because the tynes are sharply lifted from the ground after each downward stroke, they tend to shake off dirt and weeds and thus in effect, are self-cleaning.

Second form of earth working tool

Referring now to Figs. 6 to 13, a second form of earth working tool 78 is described. The tool of this form of the invention consists generally of a lower shoe portion 80 having a shank 82 integrally atached along a rear recess in the shoe and extending vertically upwardly therefrom. Shank 82 is adjustably secured to a longitudinally extending mounting bar 84. Support arm 86 extends vertically upwardly from the mounting rod 84 and provides a means of attachment of the tools to guide plate 54', identical in all respects to guide plate 54 shown in Figs. 1 to 5. In effect, mounting bar 84 and arm 86 replace yoke 62 in arm 65 discussed above. It will be evident therefore, that tool 80 faces forwardly in the direction of movement of the cultivator and is swung laterally back and forth by the connecting rods 56, as before. The specific operation of this tool will subsequently be described.

The construction of tool 78 is shown more clearly in Figs. 8 to 11. The shoe portion 80 of the tool is an elongated substantially V-shaped member with arcuately shaped plates or blades 88 constituting front face portions. The centrally protruding nose or apex portion 90 of the shoe has a stepped construction, as best seen in Fig. 6. The vertical side edges 92 of the lower step and the lower arcuate edge 94 of each face 88 are sharpened to form knife edges whereby cutting action of weeds or cotton plants is more easily effected.

Considering now the operation of the tool 78, reference is made in particular to Figs. 7 and 13. As the tractor and implement are moved forwardly along the rows of cotton, tool 78 is made to oscillate back and forth across the hills of cotton on arm 65 in the manner described with regard to Figs. 1 to 5. Because the tool 78 is subjected to a component of movement in both a longitudinal 96 and a lateral 98 direction, the resultant movement of the tool will be along a line 100 angular to the row of cotton or other crops. The tool is thus presented to the row of cotton on each stroke along a line substantially normal to the face 88. The arcuate shape of the tool together with its particular mounting in the implement cooperates with the motion imparted to the swinging arm to permit the fullest and most efficient use of the implements. Thus, the construction of the tool provides a most desirable chopping and cutting effect as it acts upon the soil and the undesired cotton plants and weeds therein.

As described in relation to the form of the tool shown in Figs. 1 to 5, tool 78 is sharply lifted out of the soil after each stroke. It will be evident that as with the tynes 66, dirt, cotton plants, weeds and debris are shaken from the tool thereby making the tool self-cleaning. Fig. 7 illustrates the curved path of the tool having a sharply upswept outer arc. It should be understood that the ridged row or hill of cotton is generally narrowed with disc harrows prior to the cultivating operation of this invention, as indicated in Fig. 7.

The abrupt upswing and downswing of the tool is preferably made to occur between adjacent rows of cotton so that cotton plants, weeds and the like will be shaken off between the rows. The improved path of oscillation traversed by the tool is especially important to the second form of the invention. This motion permits a more complete entry of the tool into the soil and therefore there is a greater tendency for weeds and the like to cling to the curved faces of the tool. Thus there is even a greater need for the added clearance given to the tool during its sharp upswing in order to effect a better cleaning thereof.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An agricultural implement for cultivating row crops adapted for connection to a prime mover having a predetermined direction of earth traversing movement comprising a support connected to the prime mover; a pendant link pivotally mounted on the support on an axis substantially aligned with the direction of movement of the prime mover and having a lower end; an arm having an upper end pivotally connected to the lower end of the link and a lower end downwardly extended therefrom, said arm having a longitudinally disposed elongated slot therein; a roller mounted on the support on an axis substantially aligned with the direction of movement of the prime mover extended through the slot of the arm with the arm slidably and pivotally mounted thereon; an earth working tool mounted on the lower end of the arm; a crank pivotally mounted on the implement laterally spaced from the pivotal connection of the arm to the link, means for rotating the crank, and a connecting rod pivotally interconnecting the crank and the pivotal connection between the arm and the link for imparting pivotal oscillatory motion to said link and arm between limiting positions on each side of a vertical reference plane coincident with said predetermined direction of movement.

2. An agricultural implement comprising a support frame having a predetermined direction of earth traversing movement, a pair of brackets mounted on the frame in adjustable spaced relation transversely thereof, a fulcrum member mounted in each bracket in substantial alignment with the direction of movement of the frame, a pendant link pivotally supported in each of the brackets in substantial alignment above its respective fulcrum member and having a downwardly extended end in upwardly spaced relation to its respective fulcrum member, an arm individual to each fulcrum member having upper and lower end portions and an intermediate longitudinal slot pivotally and slidably mounted on its repsective fulcrum member by the receipt of its fulcrum member in the slot thereof, the upper end of each of the arms being pivotally connected to the link mounted thereabove, earth working tools borne by the lower ends of the arms for earth engagement, a rotated crank mounted on the frame intermediate the brackets, and a telescopically adjustable connecting rod interconnecting the crank and the lower end of each link thereby to reciprocate the earth working tools along arcuate paths between limiting positions on each side a vertical reference plane coincident with the predetermined direction of movement.

3. An agricultural implement comprising a support frame having a predetermined direction of earth traversing movement, a pair of brackets mounted on the frame in adjustable spaced relation transversely thereof, a fulcrum member mounted in each bracket in substantial alignment with the direction of movement of the frame, a pendant link pivotally supported in each of the brackets in substantial alignment above its respective fulcrum member and having a downwardly extended end in upwardly spaced relation to its respective fulcrum member, an arm individual to each fulcrum member having upper and lower end portions and an intermediate longitudinal slot pivotally and slidably mounted on its respective fulcrum member by the receipt of its fulcrum member in the slot thereof, the upper end of each of the arms being pivotally connected to the link mounted thereabove, a pair of elongated transversely concavo-convex plates each having a longitudinal edge and an end edge mounted on the lower end of each arm, said plates of each pair being joined in acute angular relation along their longitudinal edges forwardly from their respective arms with their concave sides forwardly and laterally disposed therefrom, the end edges of the plates being downwardly disposed and arcuately forwardly extended and providing downwardly and forwardly disposed sharpened edges, a crank rotatably mounted in the frame intermediate the brackets, telescopically adjustable connecting rods interconnecting the crank and the lower end of each link, and drive means rotating the crank to oscillate the links and arms at a speed in relation to the speed of earth traversing movement of the frame causing the plates to move through the earth in successive angularly related paths of travel each substantially radially of the concave side of the plate disposed theretoward.

4. An agricultural implement comprising a support frame, a tractor having a power takeoff driven at a speed synchronous to the speed of earth traversing movement thereof mounting the frame thereon, a pair of brackets mounted on the frame in adjustable spaced relation transversely thereof, a fulcrum member mounted in each bracket in substantial alignment with the direction of movement of the frame, a pendant link pivotally supported in each of the brackets in substantial alignment above its respective fulcrum member and having a downwardly extended end in upwardly spaced relation to its respective fulcrum member, an arm individual to each fulcrum member having upper and lower end portions and an intermediate longitudinal slot pivotally and slidably mounted on its respective fulcrum member by the receipt of its fulcrum member in the slot thereof, the upper end of each of the arms being pivotally connected to the link mounted thereabove, a pair of elongated transversely concavo-convex plates each having a longitudinal edge and an end edge mounted on the lower end of each arm, said plates of each pair being joined in acute angular relation along their longitudinal edges forwardly from their respective arms with their concave sides forwardly and laterally disposed and arcuately forwardly extended and providing downwardly and forwardly disposed sharpened edges, a crank rotatably mounted in the frame intermediate the brackets, telescopically adjustable connecting rods interconnecting the crank and the lower end of each link, a drive linkage interconnecting the power takeoff of the tractor and the crank whereby the links and arms are oscillated between positions on each side of vertical planes coincident with the respective fulcrums and said predetermined direction of movement at a speed so synchronized with the speed of earth traversing movement of the tractor that the plates are carried in earth engagement along successive angularly related paths of travel substantially radially of the concave blades disposed theretoward, and ground support wheels mounted on the brackets in supporting relation to the brackets and frame and in adjustably spaced relation to the frame whereby the frame is carried in adjusted elevation over earth traversed.

5. An earth working tool adapted for the thinning and weeding of row crops comprising a pair of elongated transverse concavo-convex plates, each having a longitudinal edge and an end edge, said plates being joined along their longitudinal edges whereby the convex surfaces of the plates are inwardly disposed and the concave surfaces thereof outwardly disposed divergently from the joined edges, said plates defining a recess between the convex surfaces adjacent to the joined edges, and a substantially erect shank fitted into the recess and rigidly mounting the plates thereon in substantially erect positions, the end edges of the plates being downwardly disposed and arcuately extended in the direction of the concave surfaces and providing sharpened edges therealong.

6. An agricultural implement for cultivating row crops adapted for connection to a prime mover having a predetermined direction of earth traversing movement comprising a support connected to the prime mover; a pendant link pivotally mounted on the support on an axis substantially aligned with the direction of movement of the prime mover; an arm having an upper end pivotally connected to the lower end of the link and a lower end downwardly extended therefrom, said arm having a longitudinally disposed elongated slot therein; a roller mounted on the support on an axis substantially aligned with the direction of movement of the prime mover extended through the slot of the arm with the arm slidably and pivotally mounted thereon; a pair of elongated transversely concavo-convex plates mounted on the lower end of the arm each having a longitudinal edge and an end edge, the plates being joined in acute angular relation along their longitudinal edges forwardly from the arm with their concave sides forwardly and laterally disposed therefrom and with the joined longitudinal edges facing in the predetermined direction of movement; a crank pivotally mounted on the implement laterally spaced from the pivotal connection of the arm to the link, means for rotating the crank, and a connecting rod pivotally interconnecting the crank and the pivotal connection between the arm and the link for imparting pivotal oscillatory motion to said link and arm between limiting positions on each side of a vertical reference plane coincident with said predetermined direction of movement.

7. An agricultural implement comprising a support frame having a predetermined direction of earth traversing movement, a bracket mounted on the frame in adjustable spaced relation transversely thereof, a fulcrum member mounted in the bracket in substantial alignment with the direction of movement of the frame, a pendant link pivotally supported in the bracket in substantial alignment above the fulcrum member and having a downwardly extended end in upwardly spaced relation to the fulcrum member, an arm having upper and lower end portions and an intermediate longitudinal slot pivotally and slidably mounted on the fulcrum member the upper end of arm being pivotally connected to the link, a pair of elongated transversely concavo-convex plates each having a longitudinal edge and an end edge mounted on the lower end of each arm, the plates being joined in acute angular relation along their longitudinal edges forwardly from the arm with their concave sides forwardly and laterally disposed therefrom, the end edges of the plates being downwardly disposed and arcuately forwardly extended and providing downwardly and forwardly disposed sharpened edges, a crank rotatably mounted in the frame spaced from the bracket, a connecting rod pivotally interconnecting the crank and the lower end of the link, and drive means rotating the crank to oscillate the link and arm at a speed in relation to the speed of earth traversing movement of the frame causing the plates to move through the earth in successive angularly related paths of travel each substantially radially of the concave side of the plate disposed thereto-ward.

8. An agricultural implement comprising a support frame mounted for earth traversing movement along a predetermined line of travel with respect thereto; an elongated arm having oppositely extended ends; means mounting the arm on the frame intermediate its ends for longitudinal slidable and pivotal movement around a substantially horizontal axis substantially aligned with the line of travel, the arm having portions upwardly and downwardly extended from the mounting means; an earth working tool mounted on the downwardly extended portion of the arm; means mounted on the frame connected to the upwardly extended portion of the arm for constraining said upwardly extended portion to move in a substantially circular path having a center above the connection of the arm to the constraining means, the circular path being in a plane substantially normal to the direction of earth traversing movement of the support frame; and drive means mounted on the frame having driving connection to the upwardly extended portion of the arm for imparting reciprocal movement to said upwardly extended portion along only a fraction of said circular path between limiting positions on opposite sides of a substantially vertical reference plane coincident with said line of travel.

9. An agricultural implement adapted for cultivation of row crops comprising a support frame mounted for earth traversing movement along a predetermined line of travel longitudinally of a row of crops to be cultivated; a substantially horizontal pivot member mounted in the frame in substantial alignment with said line of travel; an elongated arm having an elongated longitudinally disposed slot fitted on the pivot member for slidable and pivotal movement of the arm on the pivot member, the arm having portions upwardly and downwardly extended from the pivot member; an earth working tool mounted on the downwardly extended portion of the arm; means mounted on the frame connected to the upwardly extended portion of the arm for constraining said upwardly extended portion to move in a substantially circular path having a center above the connection of the arm to the constraining means, the circular path being in a plane substantially normal to the direction of earth traversing movement of the support frame; and drive means mounted on the frame having driving connection to the upwardly extended portion of the arm for imparting reciprocal movement to said upwardly extended portion along only a fraction of said circular path between limiting positions on opposite sides of a substantially vertical reference plane substantially coincident with said line of travel, whereby the tool is cause to move transversely of such a row along an upwardly curved path between limiting positions on opposite sides of said row, the tool being lifted sharply upwardly at each end of said path.

10. An agricultural implement for cultivating row crops comprising a support adapted for earth traversing movement longitudinally of a row; a pendant link pivotally mounted on the support on an axis substantially aligned with said predetermined direction of movement; an arm having an upper portion pivotally connected to the link, an intermediate elongated longitudinally disposed slot, and a downwardly extended lower portion; a pivot member mounted on the support on an axis substantially aligned with said predetermined direction of movement extended through the slot of the arm with the arm slidably and pivotally mounted thereon; an earth working tool mounted on the downwardly extended portion of the arm; a crank pivotally mounted on the support in laterally spaced relation to the pivotal connection of the arm to the link; means for rotating the crank; and a connecting rod pivotally interconnecting the crank and the pivotal connection between the arm and the link for imparting pivotal oscillatory motion to the link and to the arm between limiting positions on opposite sides of a substantially vertical reference plane coincident with said predetermined direction of movement.

11. An agricultural implement comprising a support frame mounted for earth traversing movement; a pendant link pivotally mounted on the frame for movement around a substantially horizontal axis; an arm having an upper portion pivotally connected to the link, a lower portion, and an elongated longitudinally extended slot; a fulcrum member mounted on the frame, defining a pivot axis substantially parallel to the pivotal axis of the link, and extended through the slot of the arm so that the arm is slidably and pivotally mounted thereon; an earth working tool mounted on the lower portion of the arm; rotary drive means mounted on the support frame for rotation about an axis of rotation in laterally spaced, substantially parallel relation to the axis of the fulcrum member; and a connecting rod having an end pivotally connected to the rotary drive means in radially spaced relation to the axis of rotation of the drive means and an opposite end pivotally connected to the pivotal connection between the arm and the link for imparting oscillatory motion to the link and to the arm between limiting positions on opposite sides of a substantially vertical reference plane.

References Cited in the file of this patent

UNITED STATES PATENTS

| 63,246 | Henderson | Mar. 26, 1867 |
| 871,295 | Rose | Nov. 19, 1907 |
| 1,348,764 | Thornhill | Aug. 3, 1920 |
| 2,043,075 | Smith | June 2, 1936 |
| 2,581,512 | Baldwin | Jan. 8, 1952 |

FOREIGN PATENTS

| 9,106 | Great Britain | of 1841 |
| 11,717 | Great Britain | of 1904 |
| 501,896 | Germany | July 8, 1930 |